(No Model.)
W. B. SMITH.
METAPHONE OR TRANSPOSITION INDICATOR.
No. 475,253. Patented May 17, 1892.
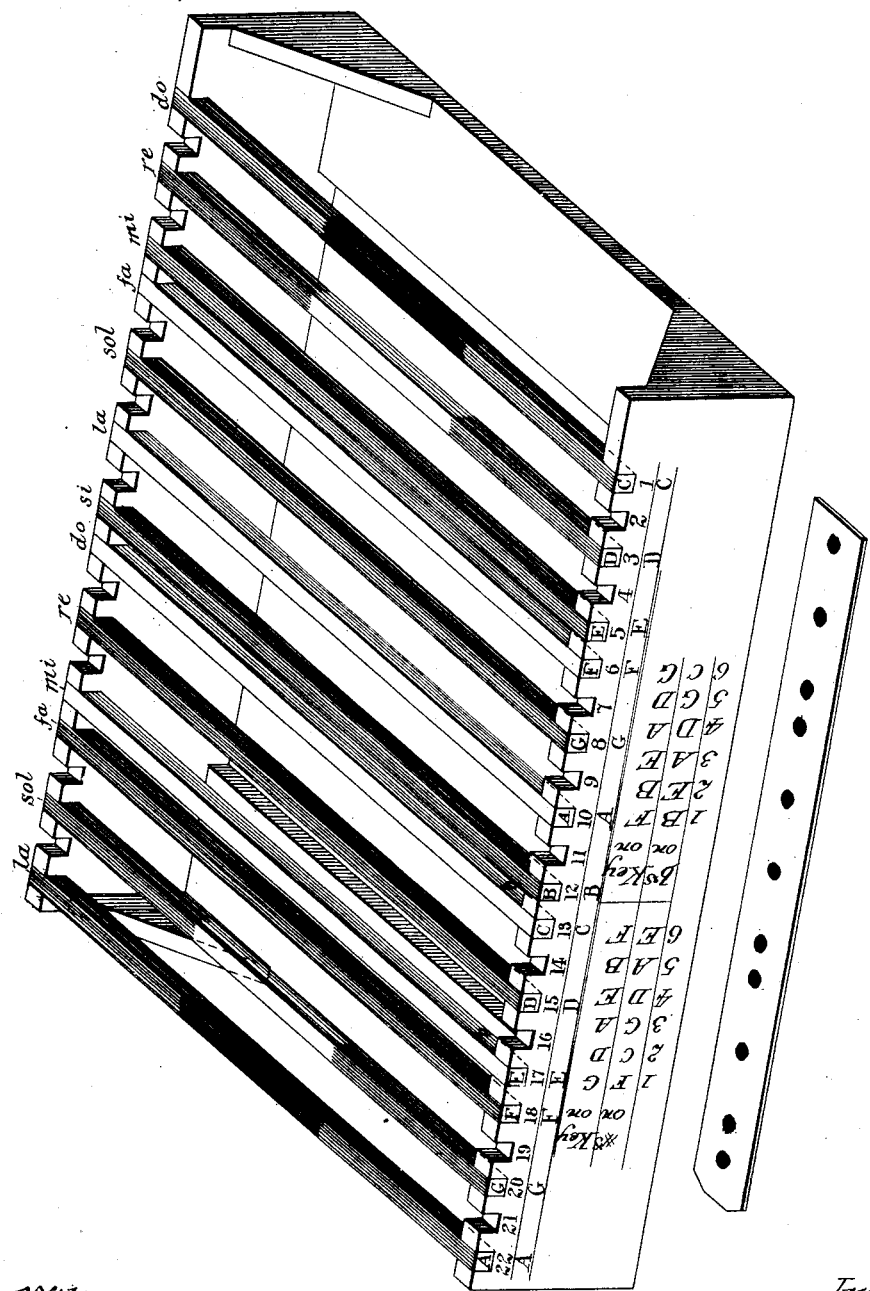
Witnesses:
Edgar Cherry,
James Kendrick Barlow.
Inventor:
William Bolivar Smith

UNITED STATES PATENT OFFICE.

WILLIAM BOLIVAR SMITH, OF SAVANNAH, TENNESSEE.

METAPHONE OR TRANSPOSITION-INDICATOR.

SPECIFICATION forming part of Letters Patent No. 475,253, dated May 17, 1892.

Application filed October 12, 1891. Serial No. 408,533. (No model.)

*To all whom it may concern:*

Be it known that I, WILLIAM BOLIVAR SMITH, a citizen of the United States, residing at Savannah, county of Hardin, and State of Tennessee, have invented new and useful Improvements in Metaphones or Transposition-Indicators, of which the following is a full, clear, and exact description, which will enable others skilled in the art to which it appertains to use the same, reference being had to the accompanying drawing, in which the figure is a perspective view of my device.

The metaphone is an apparatus to show the transposition in music, the letters of the staff (lines and spaces) being represented by material bars, black bars being used to represent the lines and white bars to represent the spaces between the lines, said bars being supported by an immovable frame, in the front edges of which are notches or slots so graded as to hold the bars at each end thereof in proper position to show the "large intervals" (or "whole tones") and also the "small intervals" (or "semitones,") and with other notches or slots prepared and so graded, into which the bars (letters) may be placed when affected by sharps ("♯") or flats ("♭") and be made to conform to the notes as represented on the diatonic scale when it is transposed; also, a strip is prepared, on which is delineated the diatonic scale with the notes at their proper intervals apart, with which to demonstrate the necessity of using sharps or flats when the key-note has been changed to a letter other than "C."

Take two pieces of one-half-inch stuff twelve inches long and three inches wide for end pieces for the immovable frame, hold them upright in front of the beholder, and fasten them together by strips in their rear or back, so that their outside edges shall be twelve inches apart. Then make notches or slots in their front edges one-fourth inch by one-fourth inch and one-fourth inch apart. Make at least twenty-two such slots in each piece. Now provide thirteen bars (of wood or metal) one-fourth inch square and twelve inches long. Color five of the bars black and place them in slots Nos. 5, 8, 12, 15, and 18 (the notches or slots being numbered from the bottom upward) to represent the lines (letters) of the staff, ("E," "G," "B," "D," and "F.") Color four of the bars white and place them in slots 6, 10, 13, and 17 to represent the spaces between the lines (or rather the letters "F" "A" "C" "E.") Then color two bars about one-third white (and the other two-thirds some other color) and place them in slots 3 and 20 to represent the space below and the space above "D" and "G.") Color the two remaining bars, the middle one-third black, and place in slots 1 and 22 to represent the leger-line below and the leger-line above, (or "C" and "A.") This represents the letters under the "G" clef.

*Diatonic scale.*—Use a strip of any suitable material (say one inch wide and nine inches long) on which is delineated the diatonic scale, the notes at proper intervals apart, (one inch to represent a tone and one-half inch to represent a semitone.) Now place "do" of the scale (or the key-note) on the leger-line below. The notes of the scale will coincide with the letters (bars) of the staff.

*Transposition.*—Place "do" of the scale on "G." It will be seen that the notes of the scale do not conform to the letters of the staff. Now place a sharp upon the upper "F," by gumming the character "♯" on the upper side of the bar.) Turn the bar "F" so as to show the "sharp" and raise both "F's" to the next slot above, (a semitone.) Then the notes of the scale will coincide with the letters of the staff. Proceed in like manner for any number of sharps. Thus two sharps give key "D," three sharps the key of "A," &c. When flats are used, depress the proper letters a semitone. (The "♭'s" are gummed on the under side of the bar.) Thus flat "B" for key "F," flats "B" and "E" for key "B," flats "B," "E," and "A" give key "E," &c.

What I claim as my invention is—

The device for indicating musical transpositions, consisting of the frame provided with the notches and the series of bars colored and arranged to represent the lines and spaces of the staff and in the proper order to indicate the intervals of the tones and half-tones.

WILLIAM BOLIVAR SMITH.

Witnesses:
EDGAR CHERRY,
JAMES KENDRICK BARLOW.